(12) United States Patent
Abe

(10) Patent No.: US 6,785,454 B2
(45) Date of Patent: Aug. 31, 2004

(54) OPTICAL WAVEGUIDE AND OPTICAL CIRCUIT BASE COMPONENT

(75) Inventor: Shinichi Abe, Kyoto (JP)

(73) Assignee: Kyocera Corporation, Kyoto (JP)

( * ) Notice: Subject to any disclaimer, the term of this patent is extended or adjusted under 35 U.S.C. 154(b) by 248 days.

(21) Appl. No.: 10/033,828

(22) Filed: Dec. 19, 2001

(65) Prior Publication Data

US 2002/0105000 A1 Aug. 8, 2002

(30) Foreign Application Priority Data

Dec. 20, 2000 (JP) .................................. P2000-387852

(51) Int. Cl.$^7$ ................................................ G02B 6/02
(52) U.S. Cl. ........................ 385/123; 385/130; 385/131
(58) Field of Search ......................... 385/123, 129–132

(56) References Cited

U.S. PATENT DOCUMENTS

| | | | | |
|---|---|---|---|---|
| 5,526,449 A | * | 6/1996 | Meade et al. .................. | 385/14 |
| 6,134,043 A | * | 10/2000 | Johnson et al. ............. | 359/237 |
| 6,175,671 B1 | * | 1/2001 | Roberts ........................ | 385/14 |
| 6,317,554 B1 | * | 11/2001 | Kosaka et al. .............. | 385/132 |
| 6,358,854 B1 | * | 3/2002 | Fleming et al. ............. | 438/692 |
| 6,468,823 B1 | * | 10/2002 | Scherer et al. ................ | 438/31 |
| 6,473,220 B1 | * | 10/2002 | Clikeman et al. ........... | 359/247 |
| 6,560,006 B2 | * | 5/2003 | Sigalas et al. .............. | 359/321 |

\* cited by examiner

*Primary Examiner*—Ellen E. Kim
(74) *Attorney, Agent, or Firm*—Hogan & Hartson L.L.P.

(57) ABSTRACT

In a conventional optical waveguide using a photonic crystal, loss of light occurs in the substrate therebelow. The invention provides an optical waveguide comprising a substrate, a core portion formed on the substrate, and clad portions arranged on the substrate so that the core portion is sandwiched therebetween. The clad portions each have a periodic structure which exhibits a periodic variation in refractive index in a direction perpendicular to a light propagation direction, and at least one of the periodic structures is inclined with respect to a surface of the substrate so that an interval between the periodic structures is gradually reduced toward the substrate. The slim, compact optical waveguide can be fabricated in a relatively simple and easy process, incurs lower loss, offers satisfactory light propagation characteristics, and has adequate mechanical strength.

19 Claims, 9 Drawing Sheets

OPTICAL WAVEGUIDE AND OPTICAL CIRCUIT BASE COMPONENT

BACKGROUND OF THE INVENTION

1. Field of the Invention

The present invention relates to a low-loss, easily-manufacturable optical waveguide using a clad portion having an optical periodic structure called a photonic crystal, which is suitable for an optical waveguide-integrated optical circuit substrate designed for use in optical communications and optical data processing, and to an optical integrated circuit employing the same.

2. Description of the Related Art

A three-dimensionally shaped optical waveguide formed on a substrate has been used as an important optical element for constituting an optical integrated circuit designed for use in optical communications and optical data processing. In conventional optical waveguides, a high refractive-index portion, acting as a core portion for propagating light, is surrounded by a low refractive-index portion, acting as a clad portion. With this structure, propagating light is confined within and around the high refractive-index portion, thereby achieving wave guiding.

However, in such an optical waveguide as utilizes refractive-index difference, if curved and branching portions of the optical waveguide do not have a sufficiently gentle curve, guided light inconveniently finds its way into the low refractive-index portion, resulting in occurrence of great loss. Trying to prevent the loss, if the curved and branching portions are given a gentle curve, the substrate onto which the optical waveguide is formed needs to have an unduly large dimension, which makes it difficult to realize a compact optical circuit substrate, and leads to poor productivity.

To solve such problems, optical waveguide structures using a photonic crystal have been proposed to date (refer to Japanese Unexamined Patent Publication JP-A 8-505707 (1996), Japanese Unexamined Patent Publication JP-A2000-56146 (2000), or others). The photonic crystal is constituted by forming in an optical material a structure such that a refractive index periodically varies with cycles ranging from ca. 0.1 to 1.0 $\mu$m. Such a periodic structure has a wavelength band in which no propagation of light occurs (photonic bandgap). Therefore, in an optical waveguide having such a structure that the core portion is surrounded by a photonic crystal, even in a sharp curved portion, theoretically no radiation loss occurs for guided light in the photonic bandgap.

Photonic crystal structures are roughly classified into two-dimensional and three-dimensional structures. A two-dimensional photonic crystal, when formed on a substrate, exerts a photonic bandgap effect only in a direction parallel to the substrate, and by contrast a three-dimensional photonic crystal exerts a photonic bandgap effect in every direction including directions parallel and perpendicular to the substrate.

However, a three-dimensional photonic crystal has a relatively narrow photonic bandgap and requires a complicated manufacturing process. Hence, it is to be expected that an optical waveguide which has such a structure that the core portion is surrounded by a two-dimensional photonic crystal on a substrate will be industrially applied to an optical circuit substrate or the like.

FIGS. 7A and 7B are views of a conventional optical waveguide using a photonic crystal, with FIG. 7A showing a plan view and FIG. 7B showing a sectional view. On a substrate 23 serving also as a lower clad portion is formed an optical material for constituting an optical waveguide having a core portion 21. On both sides of the core portion 21 are formed clad portions 22 so as to penetrate through part of the optical material and the substrate 23. The clad portion 22 has a periodic structure which exhibits a periodic variation in refractive index. Herein, a columnar periodic structure is employed.

However, in the optical waveguide having such a structure that the core portion 21 is surrounded by the clad portions 22 made of a two-dimensional photonic crystal, while an excellent photonic bandgap effect is exerted in a direction which is parallel to the surface of the substrate 23 and perpendicular to a light propagation direction in the core portion 21, no photonic bandgap effect is exerted in a direction perpendicular to the surface of the substrate 23. Therefore, in the direction perpendicular to the surface of the substrate 23, light is confined by exploiting the difference in refractive index between the core portion 21 and the substrate 23, or between the core portion 21 and air.

In this case, since the upper clad portion is usually constituted by air (refractive index n=1.0), sufficiently large refractive index difference can be obtained between the upper clad portion and the core portion. This substantially prevents radiation of light toward the upper portion. However, the lower clad portion is realized by using the substrate (n>1.0). Structurally, it is thus difficult to obtain sufficiently large refractive index difference between the core portion 21 and the substrate 23 serving as the lower clad portion, which tends to cause radiation loss of light in the substrate 23.

Various methods have been discussed to overcome the above-stated problem. For example, there are known a construction in which a periodic structure of a thick photonic crystal pierces deeply through a lower clad portion, and a construction in which, as shown in section in FIGS. 8A and 8B, a lower clad portion is partially removed by etching or other means to form an air-bridge structure. In the optical waveguide shown in FIGS. 8A and 8B, by adopting the air-bridge structure, part of the substrate 23, which corresponds to the lower clad portion of the optical waveguide shown in FIGS. 7A and 7B, is replaced by air. This makes it possible to secure sufficiently large refractive index difference between the core portion 21 and the air constituting the lower clad portion.

However, the former construction requires a high aspect ratio, and the latter construction requires a complicated etching process and suffers from insufficient mechanical strength of the air-bridge structure. These are the problems to be solved.

SUMMARY OF THE INVENTION

The invention has been made in view of the above-stated problems with conventional art, and accordingly an object of the invention is to provide a low-loss optical waveguide having a clad portion made of a photonic crystal, which can be manufactured in a simple process.

Another object of the invention is to provide an optical circuit base component provided with said low-loss optical waveguide which has a clad portion made of a photonic crystal and can be manufactured in a simple process, said optical circuit base component enabling attainment of miniaturization and high integration.

The invention provides an optical waveguide comprising:
a substrate;
a core portion formed on the substrate; and
clad portions arranged on the substrate so that the core portion is sandwiched therebetween, the clad portions each having a periodic structure which exhibits a periodic variation in refractive index in a direction perpendicular to a light propagation direction, wherein at least one of the periodic structures is inclined with respect to a surface of the substrate so that an interval between the periodic structures is gradually reduced toward the substrate.

According to the invention, in the optical waveguide, of the clad portions having a periodic structure and arranged on the substrate so that the core portion is sandwiched therebetween, at least one is inclined with respect to the surface of the substrate so that an interval between the clad portions is gradually reduced toward the substrate. With this inclination, a photonic bandgap effect derived from a photonic crystal having a periodic structure exerts on the below of the core portion. Thus, as compared with the conventional optical waveguide in which confinement of light is achieved by exploiting the difference in refractive index between the core portion and the substrate, said optical waveguide succeeds in confining guided light within and around the core portion more securely. Moreover, as compared with the conventional optical waveguide in which the photonic crystal is made thick, said optical waveguide has a lower aspect ratio to achieve slimness. Further, as compared with the conventional optical waveguide in which the lower clad portion is removed by etching or other means to form an air-bridge structure, said optical waveguide requires fewer manufacturing process steps and maintains adequate mechanical strength. As a result, it is possible to realize a slim, compact optical waveguide offering excellent light propagation characteristics and adequate mechanical strength, which can be fabricated in a relatively simple and easy manufacturing process.

In the invention, it is preferable that, in the optical waveguide, at least one of the periodic structures is inclined an angle of 5 to 60 degree from a direction perpendicular to the surface of the substrate.

According to the invention, at least one of the periodic structures is inclined an angle of 5 to 60 degree from a direction perpendicular to the surface of the substrate. This arrangement makes it possible to enhance the light confinement effect exerted on the core portion on the substrate side, to prevent radiation of light toward the above of the core portion, and to keep the width of the optical waveguide in an appropriate range, thereby achieving miniaturization of the optical waveguide.

In the invention, it is preferable that, in the optical waveguide, the two periodic structures make contact with each other at their lower ends.

In cases where the two periodic structures make contact with each other at their lower ends, it is possible to ensure that the photonic crystal exerts a light confinement effect on the core portion on the substrate side, there by preventing guided light from escaping from the core portion into the substrate. As a result, an optical waveguide can be realized that suffers little from loss of light and offers excellent propagation characteristics.

In the invention, it is preferable that, in the optical waveguide, the periodic structure is configured as a columnar periodic structure.

By providing the clad portion with a columnar periodic structure, for example, a triangular lattice air-rod periodic structure or a honeycome lattice dielectric columnar periodic structure, TE-mode light and TM-mode light can be concurrently subjected to a photonic bandgap effect. This helps prevent leakage of guided light having various modes and polarizing planes, thereby suppressing loss of light. As a result, an optical waveguide can be realized that is excellent in light propagation characteristics.

In the invention, it is preferable that, in the optical waveguide, a period of the periodic structure has a thickness corresponding to 20 to 60 percent of a wavelength of light propagating through the core portion.

In the invention, it is preferable that, in the optical waveguide, the periodic structure has five periods or more.

In the invention, it is preferable that, in the optical waveguide, column components of the columnar periodic structure occupy 20 to 80 percent of a sectional area of the columnar periodic structure sectioned along a direction perpendicular to a length of the column component.

The invention further provides an optical circuit base component comprising:

a substrate;

said optical waveguide formed on the substrate; and a portion formed on the substrate, for mounting an optoelectronic conversion element which is optically coupled to said optical waveguide.

According to the invention, the optical circuit base component has the optical waveguide of the invention, and the optical waveguide is optically coupled to an optoelectronic conversion element to be mounted on the optical circuit base component. With this construction, since the low-loss optical waveguide is made smaller in size and thickness, offers excellent optical-signal transmission characteristics, and can be fabricated in a simple process, miniaturization and high integration are achieved. The optical circuit base component is accordingly suitable for an optical module or the like designed for use in optical communications and optical data processing.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1A:
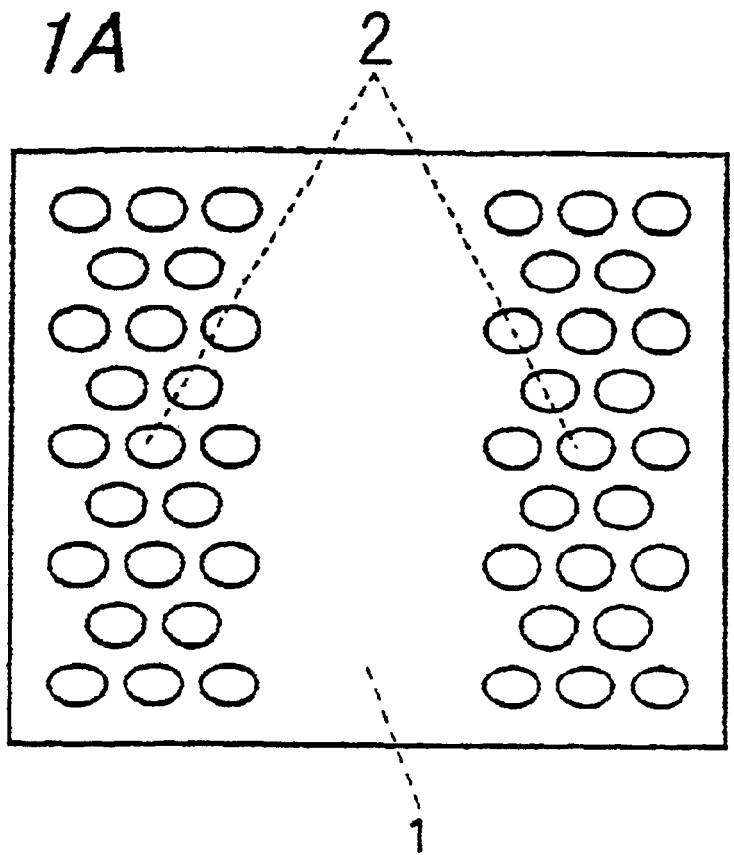
FIGS. 1A and 1B are respectively show plan and sectional views of an embodiment of an optical waveguide according to the invention.

Now referring to the drawings, preferred embodiments of the invention are described below.

Figure 1B:
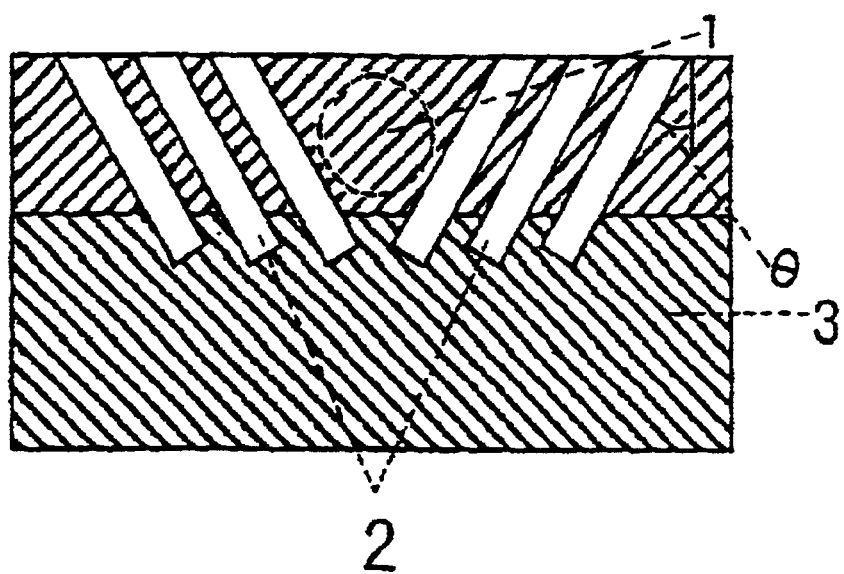

FIGS. 1A and 1B respectively show a plan view and a sectional view of an embodiment of the optical waveguide according to the invention. In FIGS. 1A and 1B, the optical waveguide includes a core portion 1, clad portions 2, and a substrate 3. The core portion 1 is formed on the substrate 3. Likewise, the clad portions 2 are formed on the substrate 3. The clad portions 2 are so arranged that the core portion 1 is sandwiched therebetween and each have a periodic structure exhibiting a periodic variation in refractive index in a direction which is parallel to a surface of the substrate 3 and perpendicular to a light propagation direction. The periodic structures are inclined with respect to the surface of the substrate 3 so that an interval between the periodic structures is gradually reduced toward the substrate 3. Although it is only necessary that at least one of the clad portions 2 is inclined with respect to the surface of the substrate 3, in this embodiment, both of the clad portions 2 are inclined with respect to the surface of the substrate 3. This is because, by doing so, a more satisfactory light confinement effect can be obtained at the below of the core portion 1, i.e. on the substrate 3. Moreover, in this embodiment, the clad portion 2 is formed by using a photonic crystal with a columnar periodic structure. Note that symbol θ represents an angle at which the periodic structure of the clad portion 2 is inclined from a direction perpendicular to the surface of the substrate 3 (inclination angle).

The illustrative photonic crystal with a structure like a columnar periodic structure, used as the clad portion 2, exhibits a periodic variation in refractive index only in two directions, and is thus called a two-dimensional photonic crystal. Alternatively, as the clad portion 2, a one-dimensional photonic crystal may be used that exhibits a periodic variation in refractive index only in one direction. For example, there is known a photonic crystal with a multi-layer periodic structure in which layers having different refractive indices are stacked on top of one another in a direction perpendicular to a light propagation direction of an optical waveguide. However, using a two-dimensional photonic crystal with a structure like a columnar periodic structure as the clad portion 2 is advantageous in that, in the core portion 1 sandwiched between the clad portions 2, TE-mode polarizing light and TM-mode polarizing light are concurrently subjected to a photonic bandgap effect. Thus, its use makes it possible to fabricate an optical waveguide having improved transmission characteristics.

With regard to optical materials used for the core portion 1 and the clad portion 2, in order for the core portion 1 to function as a high refractive-index portion, and to form a photonic crystal acting as the clad portion 2, it is preferable to use a material which has a relatively high refractive index and is transparent for a wavelength band of guided light. The examples thereof include: GaAs; a material obtained by forming an AlGaAs film onto GaAs; InP; a material obtained by forming an InGaAs film onto InP; and Si.

The substrate 3, which has on its surface the optical waveguide composed of the core portion 1 and the clad portion 2, serves as a supporting substrate for the optical waveguide and also serves as a supporting substrate on which photoelectric circuits are formed, such as an electric circuit and an optical waveguide. Thus, as said substrate 3, it is possible to use various substrates designed to deal with optical signals, for example, an optical integrated circuit substrate or a hybrid photoelectronic substrate. The examples thereof includes: a silicon substrate; a GaAs substrate; an InP substrate; a glass substrate; an alumina substrate; a glass ceramic substrate; a multi-layer ceramic substrate; and a plastic electric wiring substrate. Moreover, the substrate 3 may also be designed to function as a clad portion of conventional design in which difference in refractive index is exploited, i.e. designed to have a lower refractive index relative to the core portion 1, by using a certain optical material. In this case, the material of the substrate 3 may be either the same as or different from that of the core or clad portion 1, 2.

In the optical waveguide of the invention, since the above of the core portion 1 is filled with air or evacuated to secure sufficiently large refractive-index difference, light is firmly confined within the core portion 1. Meanwhile, the periodic structures constituting the clad portion 2 are inclined from a direction perpendicular to the surface of the substrate 3, so that the below of the core portion 1 is surrounded by the periodic structures, and the interval between the periodic structures is gradually reduced toward the surface of the substrate 3. That is, the photonic crystal exhibiting a satisfactory light confinement effect is so arranged as to lie below the core portion 1. Conventionally, the periodic structure of the photonic crystal constituting the clad portion 2 is arranged perpendicularly to the surface of the substrate, and thus it is inevitable that the light confinement in the below of the core portion 1 is poorer than in the above of the core portion 1. Hence, with said arrangement, the below of the core portion 1 benefits from the photonic bandgap effect derived from the photonic crystal, so that light is firmly confined within the core portion 1. This prevents radiation loss of guided light from occurring in the below of the core portion 1.

The inclination angle θ of the periodic structure constituting the clad portion 2 with respect to the surface of the substrate 3 should preferably be set at 5 degree or above. This is because, if the inclination angle θ is too small, it is impossible to prevent the light in the core portion 1 from radiating downwardly. Meanwhile, the larger the inclination angle θ, the more satisfactorily the light in the core portion 1 can be prevented from radiating downwardly. However, if the inclination angle θ is too large, the optical waveguide needs to have an unduly large width. Inconveniently, this adds to the difficulty of forming and processing a periodic structure for such an optical waveguide. Further, in this case, light tends to radiate out into the above of the core portion 1, i.e. the air or vacuum portion. In view of the foregoing, the inclination angle θ of the periodic structure needs to be kept in an appropriate range and preferably be set at 60 degree or below. Note that, if the light propagating through the core portion 1 has a substantially circular cross section, it is possible to gain an appreciable advantage in achieving coupling with an optoelectronic conversion element or external optical circuit. From this point of view, it is most desirable to set the inclination angle θ of the periodic structure to be ca. 30 degree.

Moreover, the periodic structure of the clad portion 2, when configured as a columnar periodic structure, should preferably be inclined an angle falling in a range of ±60 degree from a direction perpendicular to the surface of the substrate 3 in the light propagation direction. If the inclination angle far exceeds 60 degree, forming and processing of the periodic structure may become difficult.

In FIGS. 1A and 1B, the columnar periodic structure of the clad portion 2 is configured as a two-dimensional photonic crystal having a structure called a triangular lattice air rod in which the two periodic structures optically make contact with each other at their lower ends. In the two-dimensional photonic crystal, the column components are formed as holes drilled in the optical material used for the optical waveguide. Although inside the column component is filled with air, other optical materials having a different refractive index may be filled therein instead.

In this embodiment, the column component essentially has a circular cross section. However, since the column component is inclined at a predetermined angle θ with respect to the surface of the substrate 3, the column component has an elliptic cross section when viewed from above the surface of the optical-waveguide portion. Note that the column component may be provided with other cross-sectional profiles, for example, a polygonal shape defined by a plurality of straight lines, or a shape defined by a plurality of curves.

It is preferable that the periodic structure exhibiting a periodic variation in refractive index, such as a columnar periodic structure or a multi-layer periodic structure, has a period with a thickness corresponding to 20 to 60 percent of a wavelength of light propagating through the core portion 1, and it is also preferable that the periods are five or above in number. By doing so, the light propagating through the core portion 1 can be subjected to the photonic bandgap effect derived from the photonic crystal. Note that, in the case of using a columnar periodic structure, the larger the diameter of the column component, the wider the wavelength range in which the photonic bandgap effect occurs. However, in consideration of the working accuracy of the column component, the strength of the periodic structure which is obtained after drilling holes for the column components, or other factors, the column components should preferably occupy ca. 20 to 80 percent, more preferably, ca. 60 percent of the sectional area of the periodic structure sectioned along a direction perpendicular to the length of the column component.

To be more specific, for example, a material having a refractive index of 3.4 is used to form a cylindrical column which is 0.5 $\mu$m in period, 1.0 in refractive index, and 0.47 $\mu$m in diameter (area occupying ratio: 80 percent), and the resultant cylindrical column components are arranged in the form of a triangular lattice. In this case, a photonic bandgap effect occurs in a wavelength band ranging from 1.0 to 1.16 $\mu$m.

Figure 2A:
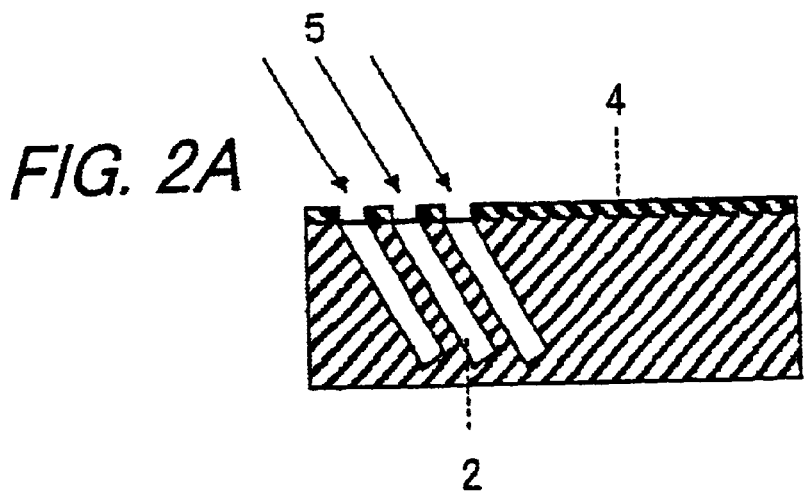
FIGS. 2A to 2C are sectional views each illustrating an example of a process for manufacturing the optical waveguide of the invention.
Figure 2B:
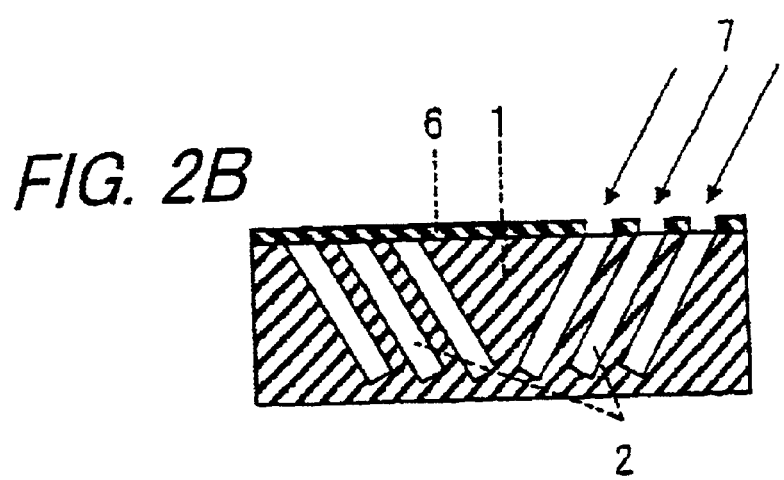
Figure 2C:
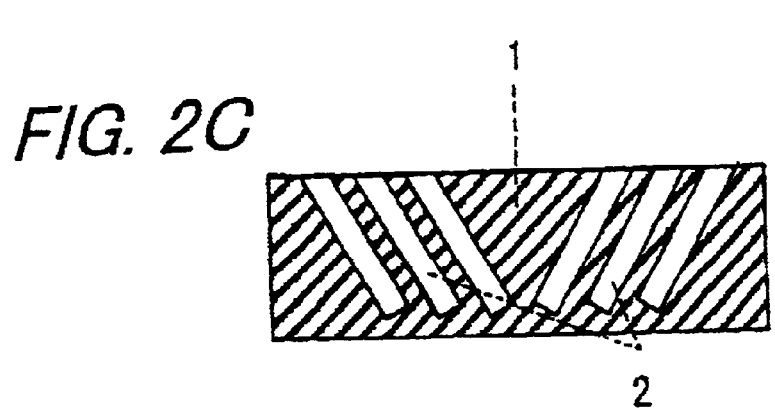

Next, a description will be given below as to a process for manufacturing the optical waveguide embodying the invention. FIGS. 2A to 2C are sectional views of an example of a process for manufacturing the optical waveguide of the invention shown in FIGS. 1A and 1B, each illustrating a process step.

Firstly, as shown in FIG. 2A, on the substrate 3 is stacked a layer made of an optical material which is formed into an optical waveguide. The layer is clothed with a mask layer 4 which is resistant to anisotropic dry etching, such as a photoresist or electron beam resist. Then, by using photolithography, a mask pattern is formed on the mask layer 4 to create one of the columnar periodic structures, and subsequently anisotropic dry etching 5 is performed from one etching direction, i.e. a direction which is inclined a predetermined angle from a direction perpendicular to the surface of the substrate 3. As a result, one of the clad portions 2 having a columnar periodic structure is fabricated that faces the core portion 1 located in the middle of the optical waveguide.

As the anisotropic dry etching 5, RIE (Reactive Ion Etching) or RIBE (Reactive Ion Beam Etching) is adopted. Etching gases are selected according to the type of material to be used. For example, a gas including, as a main component, chlorine or boron trichloride is used for etching an AlGaAs or InGaAsP material, a gas including carbon tetrachloride is used for etching an Si material, and a gas including oxygen is used for etching an organic compound material.

Secondly, after removing the mask layer 4, as shown in FIG. 2B, a new mask layer 6 is formed to create a mask pattern for a counterpart of the columnar periodic structure shown in FIG. 2A, and subsequently anisotropic dry etching 7 is performed from the other etching direction, i.e. a direction which is reverse-inclined a predetermined angle from a direction perpendicular to the surface of the substrate 3. As a result, the other of the clad portions 2 having a columnar periodic structure is fabricated that faces the core portion 1 located in the middle of the optical waveguide.

Lastly, the mask layer 6 is removed, and, as shown in FIG. 2C, the clad portions 2 having a columnar periodic structure are fabricated and arranged on both sides of the core portion 1. Eventually, the optical waveguide of the invention shown in FIGS. 1A and 1B is realized that is composed of the clad portions 2 and the core portion 1 which is sandwiched therebetween.

Figure 3A:
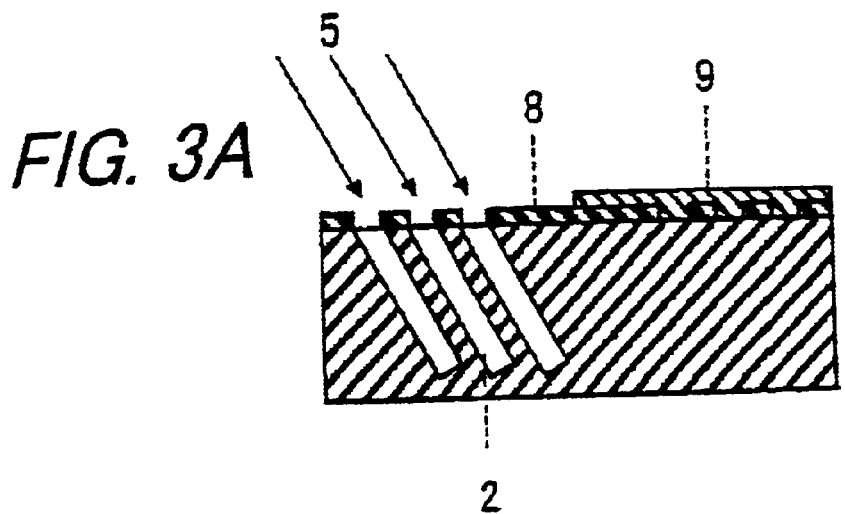
FIGS. 3A to 3C are sectional views each illustrating another example of a process for manufacturing the optical waveguide of the invention.
Figure 3B:
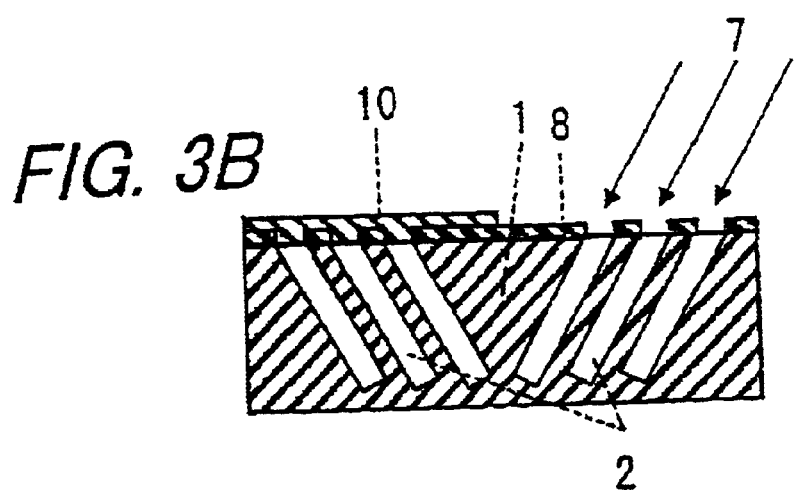
Figure 3C:
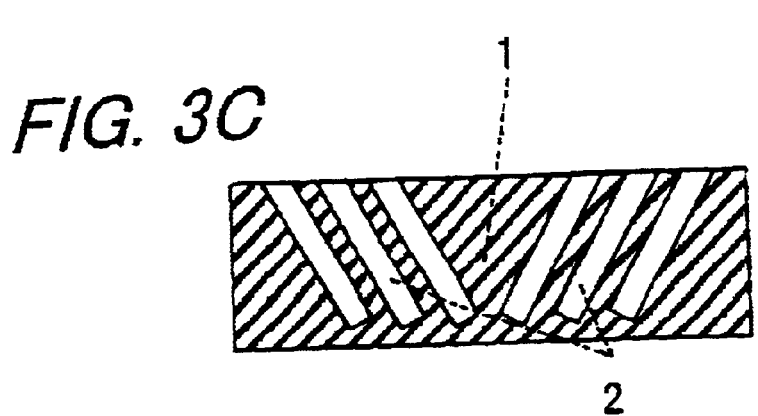

FIGS. 3A to 3C are sectional views each illustrating another example of a process for manufacturing the optical waveguide of the invention.

Referring to FIGS. 3A to 3C, a description will be given below as to another example of a process for manufacturing the optical waveguide of the invention shown in FIGS. 1A and 1B. As compared with the above-stated example, this example requires a larger number of process steps, which makes the manufacturing process somewhat complicated. However, it is advantageous in that, when the mask layer is drawn by using a photo mask or the like, there is no need to perform mask alignment with extremely high accuracy. With an electron-beam drawing apparatus or a stepper, mask alignment can be easily performed with accuracy of the order of sub-microns, whereas, with a light exposure apparatus using a normal photo mask, it is difficult to perform mask alignment with accuracy of the order of sub-microns. Thus, in the case of using the latter apparatus for the drawing of the mask layer, said process is quite effective.

Firstly, as shown in FIG. 3A, a mask layer 8 is formed to create patterns of columnar periodic structures for constituting two clad portions. After one of the columnar periodic structure patterns is covered with a mask layer 9, anisotropic dry etching 5 is performed from one etching direction, i.e. a direction which is inclined a predetermined angle from a direction perpendicular to the surface of the substrate 3. As a result, one of the clad portions 2 having a columnar periodic structure is fabricated that faces the core portion 1 located in the middle of the optical waveguide.

Secondly, as shown in FIG. 3B, after removing the mask layer 9, the finished columnar periodic structure is covered with a mask layer 10. Thereafter, anisotropic dry etching 7 is performed from the other etching direction, i.e. a direction which is inclined a predetermined angle from a direction perpendicular to the surface of the substrate 3 to a direction crossing the etching direction of the anisotropic dry etching 5. As a result, the other of the clad portions 2 having a columnar periodic structure is fabricated that faces the core portion 1 located in the middle of the optical waveguide.

Lastly, the mask layers 8 and 10 are removed, and, as shown in FIG. 3C, the clad portions 2 having a columnar periodic structure are fabricated and arranged on both sides of the core portion 1. Eventually, the optical waveguide of the invention shown in FIGS. 1A and 1B is realized that is composed of the clad portions 2 and the core portion 1 sandwiched therebetween.

The optical waveguide of the invention is not limited to the configuration illustrated in the embodiment, but may be of various configurations.

Figure 4A:
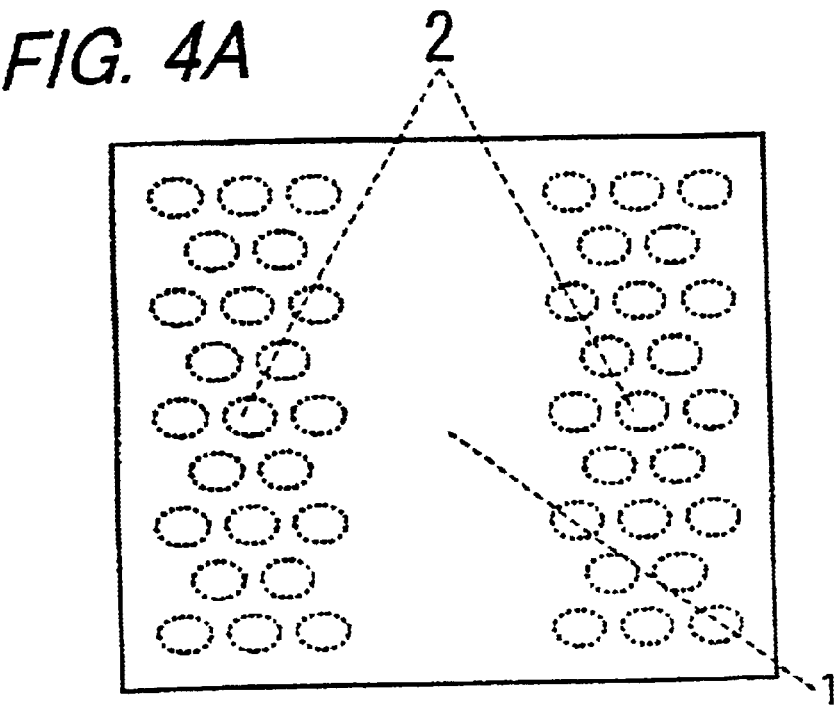
FIGS. 4A and 4B respectively show a plan view and a sectional view of another embodiment of the optical waveguide according to the invention.
Figure 4B:
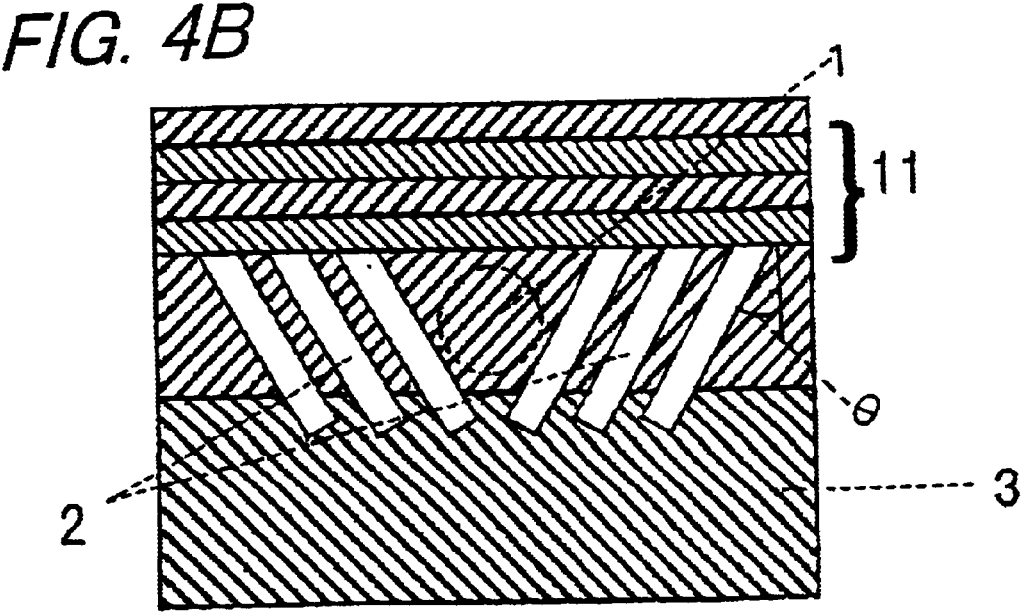

FIGS. 4A and 4B respectively show a plan view and a sectional view of another embodiment of the optical waveguide according to the invention.

The example shown in FIGS. 4A and 4B is provided with a core portion 1 and clad portions 2 having a columnar periodic structure, namely, constructed basically in the same manner as in FIGS. 1A and 1B except that, in the former, above the core portion 1 is formed an upper clad portion 11 having a multi-layer periodic structure, which is constructed of a one-dimensional photonic crystal exhibiting a periodic variation in refractive index. In this construction, a photonic bandgap effect derived from the photonic crystal can be exerted not only on the below of the core portion 1 but also on the above thereof. This makes it possible to achieve confinement of light properly, in every direction, over the entire section of the optical waveguide perpendicular to the light propagation direction.

The upper clad portion 11, which is constructed of a one-dimensional photonic crystal having a multi-layer periodic structure, has an alternating multi-layer structure composed of a high refractive-index layer and a low refractive-index layer. The high refractive-index layer is preferably made of a material similar to that used for the substrate 3. On the other hand, the low refractive-index layer is preferably made of a material which is transparent for a wavelength band of light employed for the optical waveguide, such as LiF or $MgF_2$.

Figure 5A:
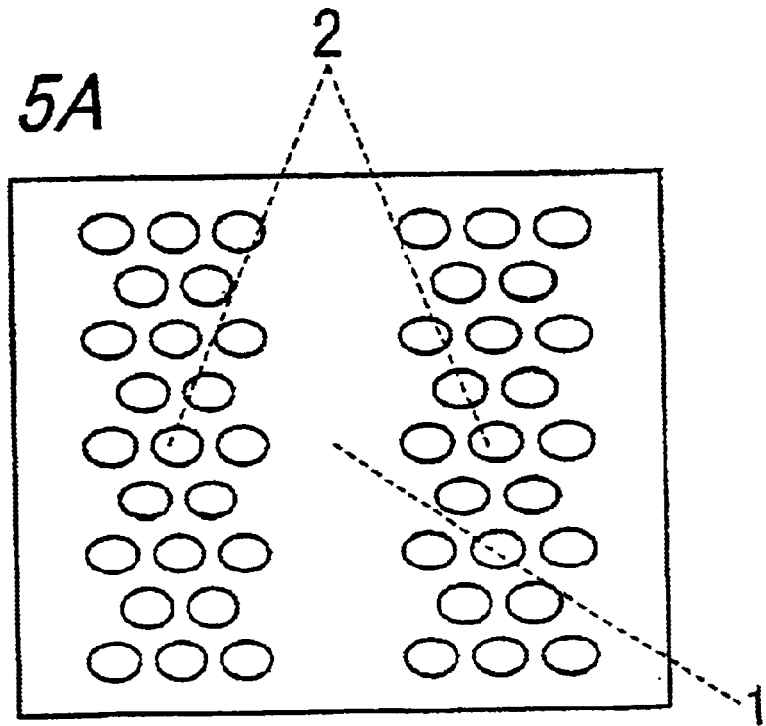
FIGS. 5A and 5B respectively show a plan view and a sectional view of yet another embodiment of the optical waveguide according to the invention.
Figure 5B:
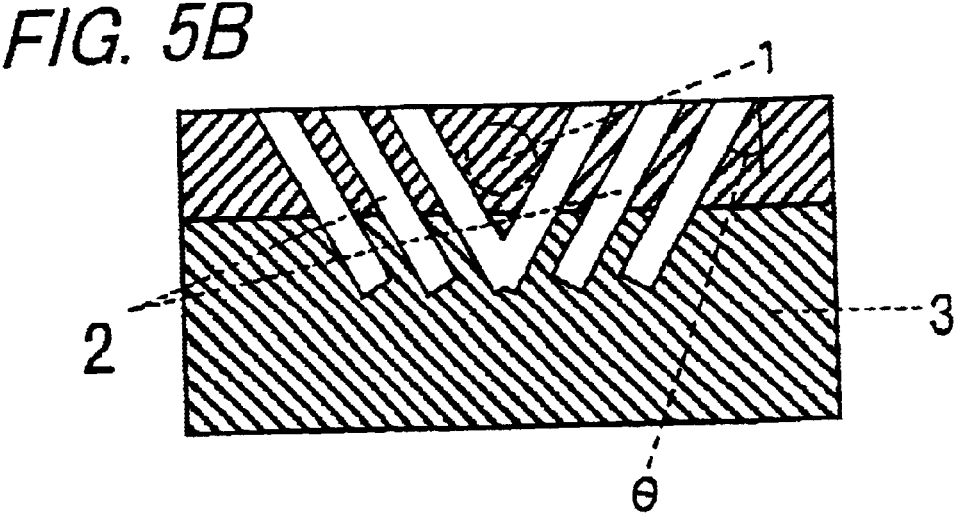

FIGS. 5A and 5B respectively show a plan view and a sectional view of yet another embodiment of the optical waveguide according to the invention.

The example shown in FIGS. 5A and 5B is constructed basically in the same manner as in FIG. 1 except that, in the former, the two clad portions 2 having a columnar periodic structure, arranged on both sides of the core portion 1, overlap each other at their lower ends under the core portion 1, so that optical and structural contact is maintained therebetween. This arrangement makes it possible to confine light within and around the core portion 1 more firmly than in the example shown in FIG. 1, there by minimizing radiation loss of light.

On the substrate having the optical waveguide of the invention formed thereon, there is arranged a portion for mounting an optoelectronic conversion element, such as a light-emitting element, a light-receiving element, or an optical computing element, which is optically coupled to the optical waveguide, whereby an optical circuit base component embodying the invention is realized. According to the invention, the optical circuit base component uses the low-loss, compact, and slim optical waveguide of the invention that is suitable for high integration. Thus, transmission and reception of optical signals can be made satisfactorily between the optical waveguide and the optoelectronic conversion element. Further, the optical circuit base component can be manufactured in a simple process. Accordingly, the optical circuit base component is suitable for an optical circuit module or the like designed for use in optical communications and optical data processing.

As such a construction as optically couples the optical waveguide of the invention to the optoelectronic conversion element mounted on the mounting portion, there are known a wavelength multiplexing optical transmitting/receiving module substrate, and an optical computing circuit substrate in which a light emitting/receiving portion and an optical switch are integrated.

Figure 6A:
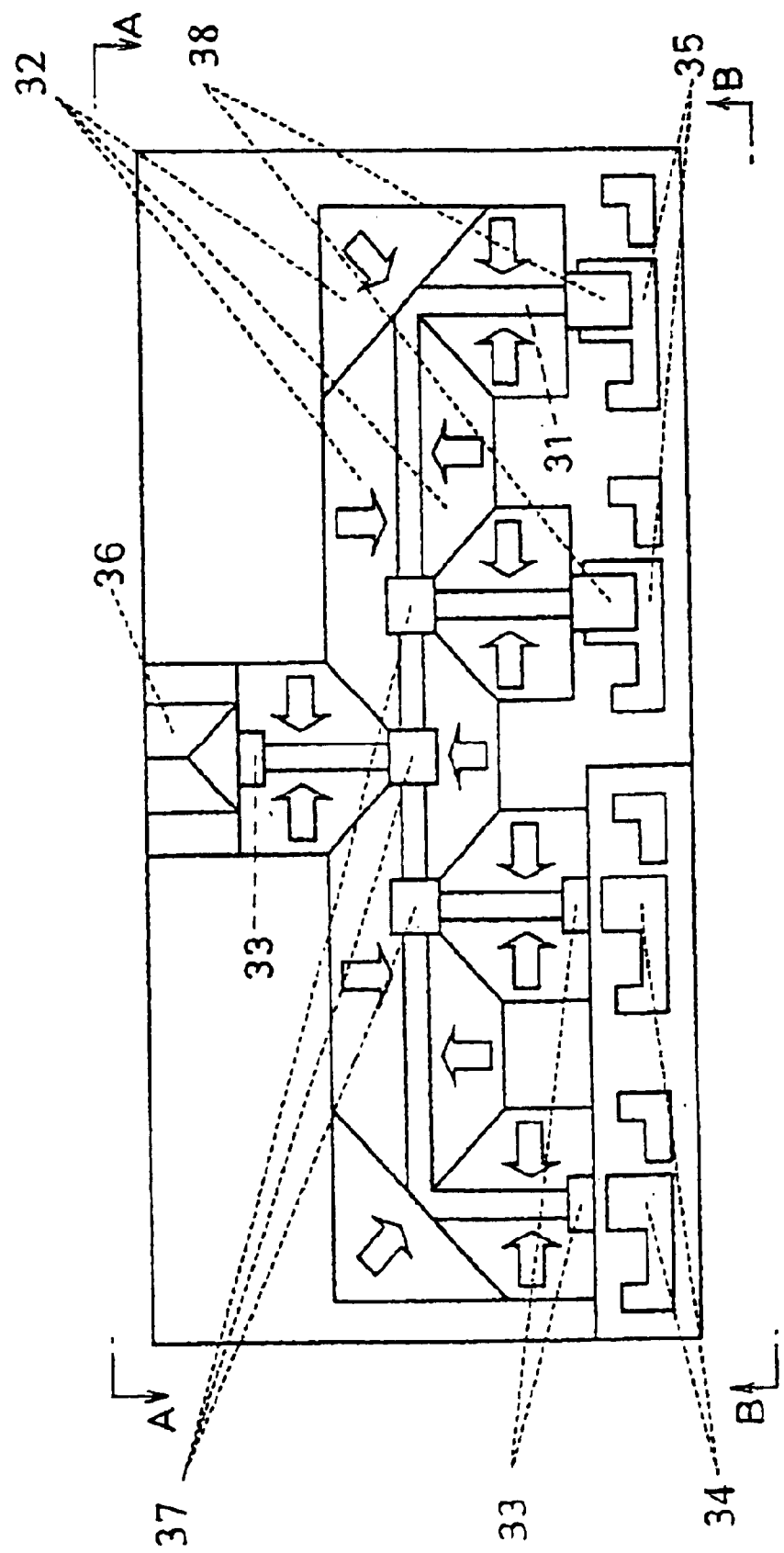
FIGS. 6A to 6C are views of an embodiment of an optical circuit base component according to the invention.
Figure 6B:
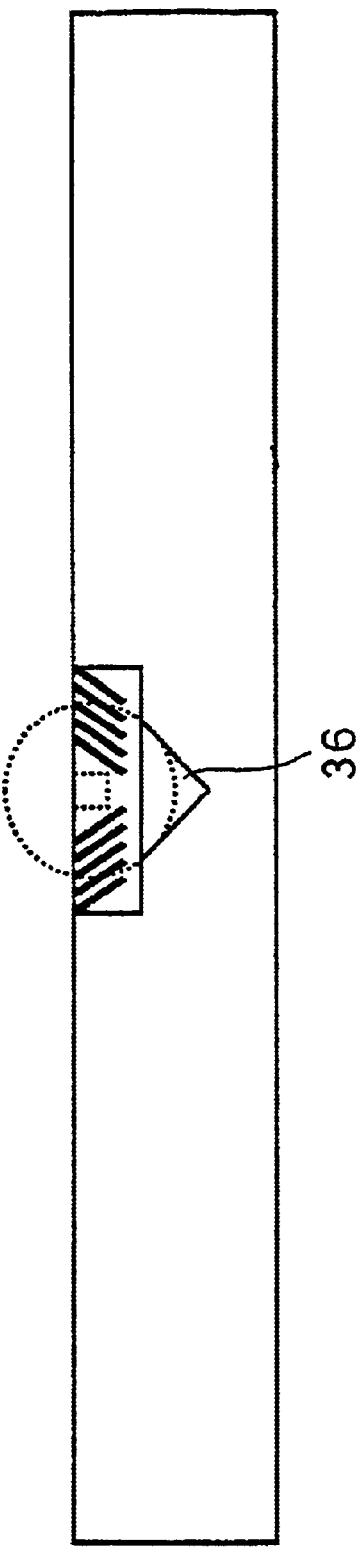
Figure 6C:
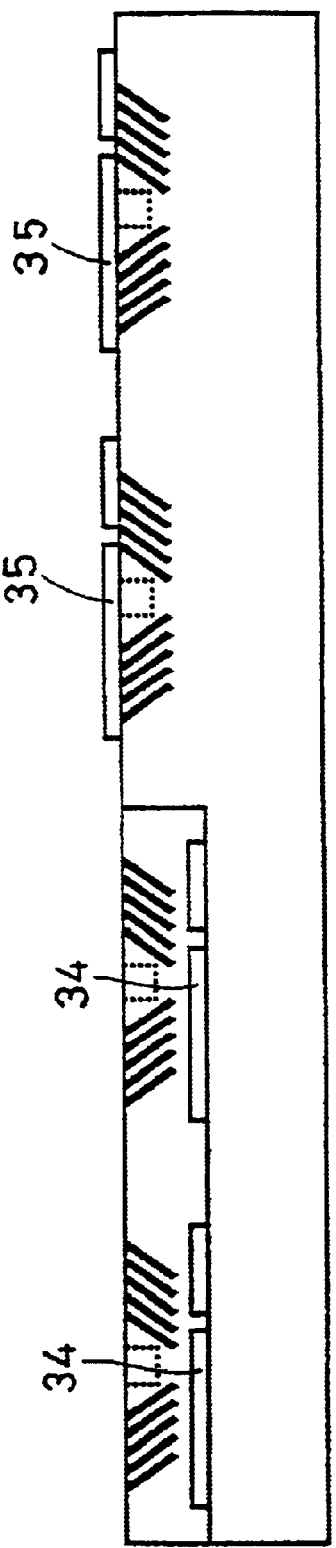
Figure 7A:
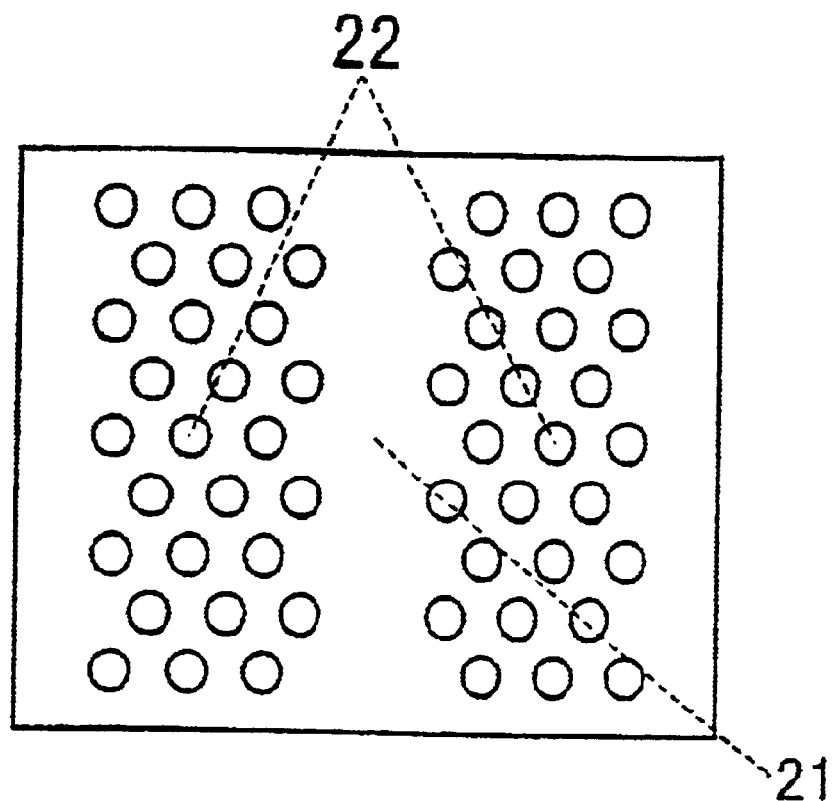
FIGS. 7A and 7B respectively show a plan view and a sectional view of an example of conventional optical waveguides.
Figure 7B:
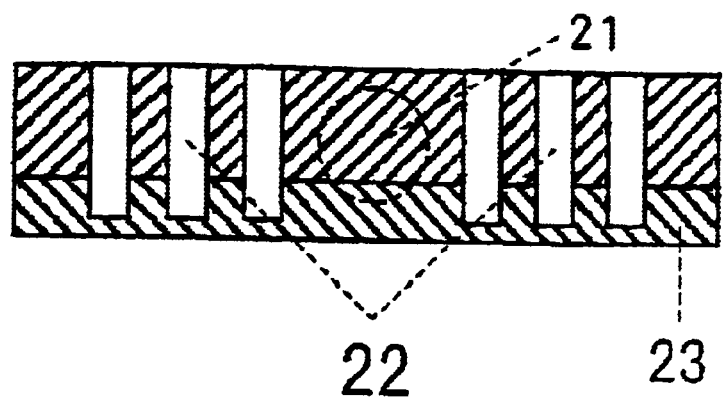
Figure 8A:
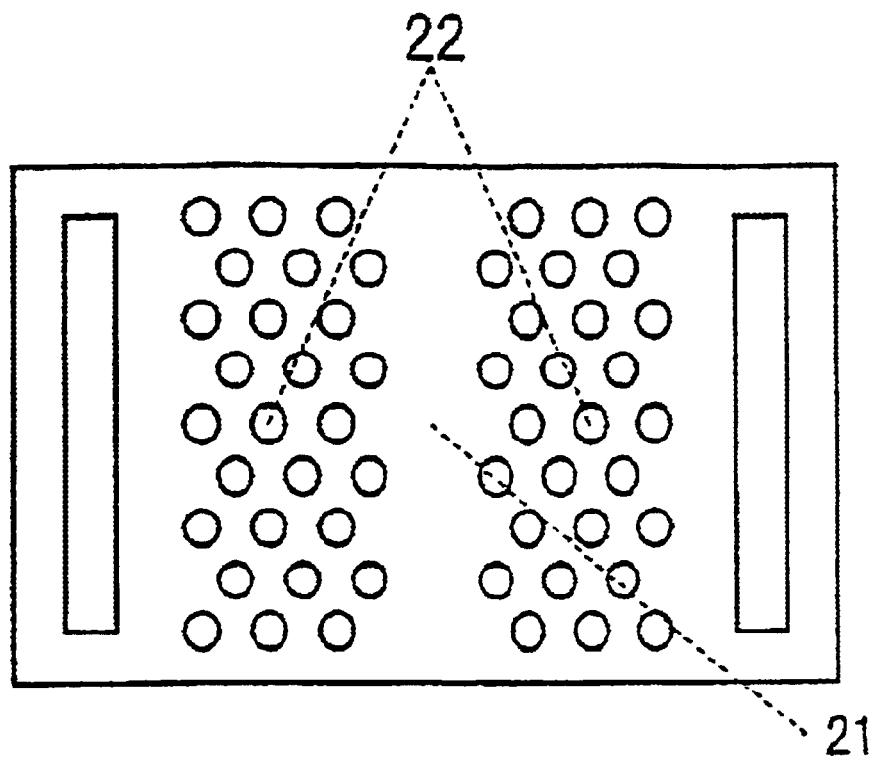
FIGS. 8A and 8B respectively show a plan view and a sectional view of another example of conventional optical waveguides.
Figure 8B:
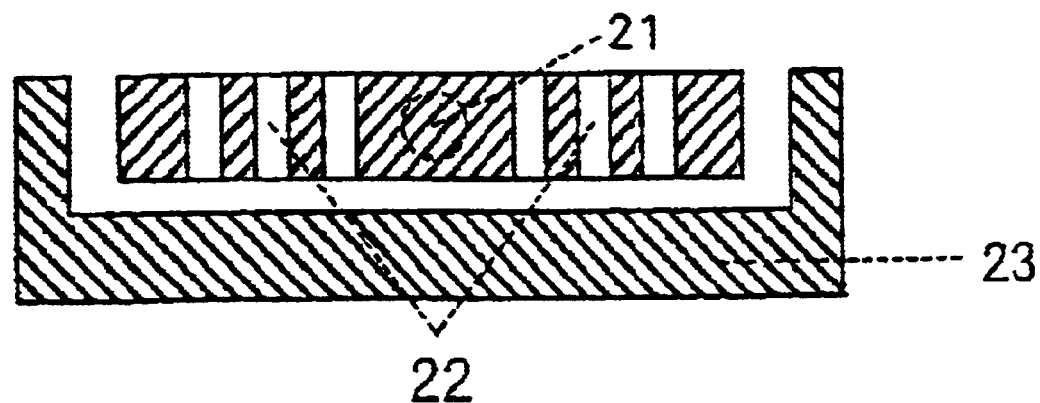

FIGS. 6A to 6C are views of a wavelength multiplexing transmitting/receiving module substrate, as an embodiment of the optical circuit base component according to the invention, with FIG. 6A showing a plan view of the optical circuit base component, FIG. 6B showing a side view of the same taken along line A—A of FIG. 6A, and FIG. 6C showing another side view of the same taken along line B—B of FIG. 6A.

In this optical circuit base component, a mode field diameter conversion portion 33, a wavelength merging/branching portion 37, and an optical path conversion portion 38 are optically connected to one another by an optical waveguide composed of a core portion 31 and a clad portion 32. Note that arrows depicted in the clad portion 32 each represent a direction in which a columnar structure is inclined. An electrode 34 for mounting an edge light emitting LD (Laser Diode) and a groove 36 for mounting an optical fiber are arranged adjacent to the mode field diameter conversion portion 33. Moreover, an electrode 35 for mounting a PD (Photo Diode) or surface light emitting LD is arranged so as to surround the optical path conversion portion 38.

Light emitted from the LD mounted on the electrode 34 for mounting an edge light emitting LD passes through the mode field diameter conversion portion 33, the core portion 31, and the wavelength merging/branching portion 37, and is then coupled to the optical fiber fitted in the groove 36 for mounting an optical fiber. Light emitted from the surface light emitting LD mounted on the electrode 35 for mounting a PD or surface light emitting LD passes through the optical path conversion portion 38, the core portion 31, the wavelength merging/branching portion 37, and the mode field diameter conversion portion 33, and is then coupled to the optical fiber fitted in the groove 36 for mounting an optical fiber. Light emitted from the optical fiber fitted in the groove 36 for mounting an optical fiber passes through the mode field diameter conversion portion 33, the core portion 31, the wavelength merging/branching portion 37, and the optical path conversion portion 38, and is then coupled to the PD mounted on the electrode 35 for mounting a PD or surface light emitting LD.

Since the core portion 31 is surrounded by the clad portions 32 having a inclined periodic structure, the optical wiring can be bent sharply and also merging and branching of waves can be achieved. Therefore, it is possible to realize an optical wiring shorter than a conventional optical wiring constituted by an optical waveguide, so that the optical circuit base component is made compact.

EXAMPLES

Hereinafter, a concrete example of the optical circuit base component of the invention will be described.

Example 1

An optical waveguide embodying the invention was fabricated using an AlGaAs optical material. The AlGaAs material allows emission of light having a wavelength of 0.7 to 0.9 μm. Here, in consideration of integration of a light emitting portion of a light emitting element made of the AlGaAs material and the optical waveguide of the invention on one substrate, light having a wavelength in the above-mentioned band is targeted for transmission. The refractive index of the material, though varies with wavelengths or the ratio between Al and Ga, is kept in a range from 2.9 (AlAs) to 3.4 (GaAs) at an wavelength of 1 μm.

Firstly, on a GaAs substrate was formed an AlGaAs film which is transparent for a transmission wavelength band by means of MBE (Molecular Beam Epitaxy) or MOCVD (Metal Organic Chemical Vapor Deposition), and then a photoresistor electron-beam resist was drawn thereon by UV (Ultraviolet ray) or electron beam irradiation. Subsequently, by using the photoresist or electron-beam resist as a mask, a columnar periodic structure was formed by means of RIE (Reactive Ion Etching) or RIBE (Reactive Ion Beam Etching) using a high-density plasma etching apparatus, whereby a clad portion was formed. As the etching gas to be used, chlorine or chlorine diluted with argon is preferable.

As a result, the optical waveguide of the invention shown in FIGS. 1A and 1B was obtained. As compared with the conventional optical waveguide having a clad portion constituted by a photonic crystal, said optical waveguide incurs lower loss and is excellent in light propagation characteristics.

Example 2

An optical waveguide embodying the invention was formed using an Si substrate. Si is transparent for light having a wavelength of 1.31 μm or 1.55 μm employed for optical communications, and further has the advantages of making easy integration of control electronic devices and allowing easy escape of heat generated by various devices mounted on the substrate including an optoelectronic conversion element. Moreover, Si is a material that lends itself to formation of a V-shaped groove, which is required to fix to the substrate means for connecting optical signals to external apparatuses, such as an optical fiber, an optoelectronic conversion element, an optical element, a driving element, and the like.

Firstly, a photoresist or electron beam resist was drawn onto the Si substrate by means of UV or electron beam irradiation. Then, by using the photoresist or electron-beam resist as a mask, a columnar periodic structure was formed by means of RIE or RIBE using a high-density plasma etching apparatus, whereby a clad portion was formed. As the etching gas to be used, a gas obtained by mixing $CF_4$ and oxygen is preferable.

Eventually, the optical waveguide of the invention shown in FIGS. 1A and 1B was obtained. As compared with the conventional optical waveguide having a clad portion constituted by a photonic crystal, said optical waveguide, like that of Example 1, incurs lower loss and is excellent in light propagation characteristics.

It has been confirmed from the above results that the optical waveguide of the invention can be fabricated in a simple process, incurs lower loss, and offers excellent light propagation characteristics.

Moreover, as an optoelectronic conversion element, a semiconductor light-receiving element was mounted on the base component having the optical waveguide formed thereon. The semiconductor light-receiving element was optically coupled to the optical waveguide, and a resultant coupling efficiency was evaluated. Then, it was confirmed that the semiconductor light-receiving element can be operated with satisfactory light transmission characteristics and optical coupling efficiency. That is, the optical circuit base component is suitable for an optical circuit module.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An optical waveguide comprising:
   a substrate;
   a core portion formed on the substrate; and
   clad portions arranged on the substrate so that the core portion is sandwiched therebetween, the clad portions each having a periodic structure which exhibits a periodic variation in refractive index in a direction perpendicular to a light propagation direction,
   wherein at least one of the periodic structures is inclined with respect to a surface of the substrate so that an interval between the periodic structures is gradually reduced toward the substrate.

2. The optical waveguide of claim 1,
   wherein at least one of the periodic structures is inclined an angle of 5 to 60 degree from a direction perpendicular the surface of the substrate.

3. The optical waveguide of claim 2,
   wherein the two periodic structures make contact with each other at their lower ends.

4. The optical waveguide of claim 3,
   wherein the periodic structure is configured as a columnar periodic structure.

5. The optical waveguide of claim 2,
   wherein the periodic structure is configured as a columnar periodic structure.

6. The optical waveguide of claim 1,
   wherein the two periodic structures make contact with each other at their lower ends.

7. The optical waveguide of claim 6,
   wherein the periodic structure is configured as a columnar periodic structure.

8. The optical waveguide of claim 1,
   wherein the periodic structure is configured as a columnar periodic structure.

9. The optical waveguide of claim 8,
   wherein column components of the columnar periodic structure occupy 20 to 80 percent of a sectional area of the columnar periodic structure sectioned along a direction perpendicular to a length of the column component.

10. The optical waveguide of claim 1,
    wherein a period of the periodic structure has a thickness corresponding to 20 to 60 percent of a wavelength of light propagating through the core portion.

11. The optical waveguide of claim 1,
    wherein the periodic structure has five periods or more.

12. An optical circuit base component comprising:
    a substrate;
    an optical waveguide comprising a substrate, a core portion formed on the substrate, and clad portions arranged on the substrate so that the core portion is sandwiched therebetween, the clad portions each having a periodic structure which exhibits a periodic variation in refractive index in a direction perpendicular to a light propagation direction, at least one of the periodic structures being inclined with respect to a surface of the substrate so that an interval between the periodic structures is gradually reduced toward the substrate; and
    a portion formed on the substrate, for mounting an optoelectronic conversion element which is optically coupled to the optical waveguide.

13. The optical circuit base component of claim 12,
    wherein, in the optical waveguide, at least one of the periodic structures is inclined at an angle of 5 to 60 degree from a direction perpendicular to the surface of the substrate.

14. The optical circuit base component of claim 13,
    wherein, in the optical waveguide, the two periodic structures make contact with each other at their lower ends.

15. The optical circuit base component of claim 14,
    wherein, in the optical waveguide, the periodic structure is configured as a columnar periodic structure.

16. The optical circuit base component of claim 13,
    wherein, in the optical waveguide, the periodic structure is configured as a columnar periodic structure.

17. The optical circuit base component of claim 12,
    wherein, in the optical waveguide, the two periodic structures make contact with each other at their lower ends.

18. The optical circuit base component of claim 17,
    wherein, in the optical waveguide, the periodic structure is configured as a columnar periodic structure.

19. The optical circuit base component of claim 12,
    wherein, in the optical waveguide, the periodic structure is configured as a columnar periodic structure.

* * * * *